United States Patent
Covic et al.

(10) Patent No.: US 9,077,194 B2
(45) Date of Patent: Jul. 7, 2015

(54) POWER DEMAND MANAGEMENT IN INDUCTIVE POWER TRANSFER SYSTEMS

(75) Inventors: Grant Anthony Covic, Auckland (NZ); John Talbot Boys, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 765 days.

(21) Appl. No.: 13/395,173

(22) PCT Filed: Sep. 9, 2010

(86) PCT No.: PCT/NZ2010/000181
§ 371 (c)(1),
(2), (4) Date: Aug. 1, 2012

(87) PCT Pub. No.: WO2011/031169
PCT Pub. Date: Mar. 17, 2011

(65) Prior Publication Data
US 2012/0319479 A1 Dec. 20, 2012

Related U.S. Application Data

(60) Provisional application No. 61/276,204, filed on Sep. 9, 2009.

(51) Int. Cl.
*H02J 5/00* (2006.01)
*H01F 27/42* (2006.01)

(52) U.S. Cl.
CPC ...................................... *H02J 5/005* (2013.01)

(58) Field of Classification Search
USPC ........................................................ 307/104
See application file for complete search history.

(56) References Cited

U.S. PATENT DOCUMENTS

| 4,317,049 | A | 2/1982 | Schweppe |
| 7,149,605 | B2 | 12/2006 | Chassin et al. |
| 7,420,293 | B2 | 9/2008 | Donnelly et al. |
| 8,073,573 | B2 | 12/2011 | Chassin et al. |
| 2004/0190211 | A1 | 9/2004 | Ockert et al. |
| 2009/0012916 | A1* | 1/2009 | Barnett ......................... 705/412 |
| 2010/0109604 | A1 | 5/2010 | Boys et al. |

OTHER PUBLICATIONS

D.J. Hammerstrom et al., "Pacific Northwest GridWise™ Testbed Demonstration Projects: Part I. Olympic Peninsula Project," PNNL-17167, Oct. 2007.
"Dynamic Demand (Electric Power)" Wikipedia, the free encyclopedia, available at http://en.wikipedia.org/wiki/Dynamic_demand_ (electric_power), Page last modified Jul. 27, 2012.

* cited by examiner

Primary Examiner — Robert Deberadinis
(74) Attorney, Agent, or Firm — Law Office of Richard F. Jaworski (57) ABSTRACT

A method of controlling power delivered to one or more loads in an inductive power transfer (IPT) system includes varying a frequency of a current in a primary conductive path (109), detecting the frequency in a pick-up inductively coupled with the primary conductive path (109), and controlling the power supplied to a load (207) associated with the pickup dependent on the detected frequency of the current in the primary conductive path (109). The frequency of the current is determined by is determined by either or both the load on a power supply (104) of the IPT system or the load on an electricity supply network supplying the power supply (104).

35 Claims, 4 Drawing Sheets

POWER DEMAND MANAGEMENT IN INDUCTIVE POWER TRANSFER SYSTEMS

The present application is based on and claims the benefit of International Application Number PCT/NZ2010/000181 filed on Sep. 9, 2010, which claims priority from U.S. Provisional Application Ser. No. 61/276,204 filed Sep. 9, 2009 and the entire contents of each of which are herein incorporated by reference.

FIELD

This invention relates to a method for managing the power demands of a load or loads in an inductive power transfer (IPT) system, in particular to balance the power requirements of the load against limitations of the IPT power supply and/or electricity supply network.

BACKGROUND

Inductive power transfer (IPT) systems are commonly used where contactless power transfer is required. For the most part IPT Systems are of relatively low power so that whether they are turned on or off has very little effect on the electricity supply network or grid. However, certain large-scale applications of IPT systems have the potential to have a significant effect on the grid. In particular, where an IPT system is used for widespread contactless/wireless charging of "plug-in" hybrid electric vehicles (PHEVs), their effect on the grid can be very substantial and techniques to power it must be introduced. This degree of control will be needed at first with PHEV's where the overnight charging load is now small but will continue to grow and then with roadway powered vehicles where the vehicles will be charged inductively using Inductive Power Transfer (IPT) from wires buried under the road surface directly into a pick-up on the car and then into its battery. This load too will probably start as a charging load but increasingly it will become a variable load that dynamically charges the vehicles while they are moving. Systems for achieving this must work with separations of 200-300 mm, at speeds up to and exceeding 100 kph, and in all weather conditions. IPT systems capable of doing this are beginning to appear.

The power required to drive a car and leave some reserve to charge the battery is of the order of 18 kW. A prospective load for 1,000,000 vehicles is 18 GW which even by International standards is equivalent to the output of a very large plant—18×1 GW nuclear reactors. Clearly if this power is required and can be switched on and off by the actions of the vehicle drivers then some degree of control is essential for the security of the power grid.

In today's Power Systems there is an increasing emphasis on 'green' power achieved using renewable sources with little or no carbon footprint. Such sources include wind, wave, and tidal power all of which are characterised by being very fluctuable to such extent that the power from them cannot be guaranteed even for only a few minutes into the future. But these power sources are important as they are carbon free and their use means that the grid frequency cannot be held as precisely as has now come to be expected. Electric vehicles either charging when parked or powered by IPT when moving along a road must therefore at some times be supplied by renewable energy sources such as wind power or wave power, but must be able to maintain their passage along the road at the required speed.

In another aspect when vehicles are moving along a road powered by IPT, power supplies to supply the roadway magnetic fields will be placed at regular intervals along the road, perhaps every 200 m, for example. These power supplies will produce power at higher frequencies, perhaps 20 kHz for IPT frequencies, and there are limits to the distance that this power can propagate before another power supply is needed. In a typical application the IPT system may use a current of 125-200 A at 20 kHz, the natural inductance of the elongate conductors that produce the magnetic field may well be 1 pH/m so that there will be a voltage drop of $\omega LI$ or nearly 16V per meter along the conductor. If the maximum allowable voltage is 800V then the voltage falls to zero after 50 m and series compensation capacitors are needed to maintain the magnetic field. These capacitors are expensive to buy and to install. In consequence, new power supplies must be used about every 200 m with each power supply actually being a dual supply that propagates current 100 m in each direction. The power supply must be able to drive all the vehicles on the 100 m of conductor attached to it. At a rating of 100 kW the supply can power 5 cars rated at 18 kW each or two buses rated at 50 kW each, but if 3 buses each rated at 50 kW are inductively coupled with a single power supply, the power supply cannot drive them all and if it collapses it makes the situation worse.

In consequence there are two conditions that the power supply must be able to manage without failure: a situation where power from the grid is simply not available as power from renewable sources is temporarily unavailable, and a situation where the instantaneous power required exceeds the rating of the power supply. Variations on these conditions are many and include the situation where a large surge of power is available and vehicles may use it to charge their batteries even though it is only a temporary surge.

There are some current proposals for solving the power system problem. It has been suggested that all PHEV chargers could be fully reversible so that when the vehicle is parked up and charging overnight the electricity company can reverse the charging process and drain energy from the batteries of all the vehicles being charged to meet a temporary power demand. This is sometimes described as a "vehicle-to-grid" or V2G system. Such a power reversal would need significant communications synchronisation over the whole country and would have to be very fast acting. In recent times power systems collapses have occurred in spectacular fashion as power systems become overloaded. In the overloaded condition the frequency of the electricity supply network or grid reduces and as it reduces many of the generators will protect themselves by dropping out—typically at 47 Hz in New Zealand or 57 Hz in the USA. As generators drop out the frequency decreases more rapidly and the condition gets worse in what is commonly known as a cascading failure. If all the reversible battery chargers could be reversed the process could be propped up but such power reversal would have to occur very quickly—probably in less than 5 seconds—in the collapsing power system to save it.

For example, if there were 1,000,000 vehicles being charged at a 2 kW rate (rated on the typical home power socket) then potentially 2 GW of power is available country wide. A communications system to initiate the power reversal may take 1 ms per connection or 1000 seconds (¼ of an hour) which is far too slow. A system-wide message would be needed in the cellular system to do this, if it is possible. Finally there is the question of cost. An electric car has an expensive battery which is rated at say 25 kWH and is good for 1,000 discharge cycles, and costs about NZD$20,000. The amount of energy available is 25 kWH at a wholesale rate of say 6 cents per kWH=$1.50. But discharging the battery takes a cycle off its life, costing $20. There is no economic sense saving $1.50 at a cost of $20. In short therefore reversible battery chargers are not a viable solution with today's batteries or even batteries that are 10 times better.

To overcome the added complexity and response time limitations of communications systems, International Publication No. WO 2008/140333 entitled "Multi Power Sourced Electric Vehicle" describes an IPT power supply which measures variations in the frequency of the electricity supply network and uses this information to control the current supplied to the primary conductive path (power pad or track) of the IPT system, thus increasing or limiting the power available to a pickup/load or loads inductively coupled with the power supply via the primary conductive path dependent on whether the grid frequency increases or decreases with respect to a predefined frequency.

The disadvantage with the above approach is that the power delivered to the load is determined by the power supply which controls the current supplied to the primary conductive path. In some circumstances, it may be more desirable or even necessary to control the power delivered to the or each load from the secondary side of the system, i.e. the or each pick-up. In multiple pick-up IPT systems, for example, it is desirable to maintain a constant current in the primary conductive path so that the power delivered to each load can be controlled independently by the respective pick-up.

In typical IPT systems the power supply is rated at a level sufficient to energise all pick-up devices simultaneously. But this condition never actually occurs in many systems, so IPT systems typically operate with only a 40% load factor.

OBJECT OF THE INVENTION

It is therefore an object of the invention to provide an IPT method, power supply, pickup, and/or system which enables secondary-side power control to balance the power requirements of the load or loads against limitations of the IPT power supply and/or electricity supply network.

Alternatively, it is object of the invention to at least provide the public with a useful choice.

Further objects of the invention will become apparent from the following description.

SUMMARY OF INVENTION

According to a first aspect the invention may broadly be said to consist in a method of controlling power delivered to one or more loads in an inductive power transfer (IPT) system having a primary conductive path and one or more pick-up devices adapted to receive power inductively from the primary conductive path, the method comprising the steps of varying a frequency of a current in the primary conductive path, detecting the frequency or an indication of the frequency in a pick-up inductively coupled with the primary conductive path, and controlling the power supplied to a load associated with said pickup dependent on the detected frequency of the current in the primary conductive path.

Preferably the frequency of the current is determined by the power available to the system.

Preferably the power available to the system is determined by either or both the load on a power supply of the IPT system or the load on an electricity supply network supplying the power supply.

Preferably the load on the electricity supply network is determined by monitoring variations in the utility supply frequency of the electricity supply network.

Preferably the step of varying a frequency of the current in the primary conductive path comprises amplitude modulating an IPT-frequency alternating current by the utility supply frequency, the IPT-frequency being higher than the utility supply frequency, thereby varying the frequency of an envelope of the amplitude modulated current in the primary conductive path.

Preferably the step of detecting the frequency of the current in the primary conductive path comprises detecting the frequency of the envelope.

Preferably the step of varying the frequency of the current comprises varying the fundamental frequency of the current.

Preferably the step of detecting the frequency of the current in the primary conductive path comprises detecting the fundamental frequency of the current in the primary conductive path.

Preferably the power supplied to the load is controlled dependent on the relationship between the detected frequency and one or more predefined reference frequencies.

Preferably the power supplied to the load is controlled between a maximum power level and a minimum power level in response to variations of the detected frequency between an upper threshold frequency and a lower threshold frequency.

In another aspect the invention broadly consists in an inductive power transfer (IPT) system having a primary conductive path and one or more pick-up devices adapted to receive power inductively from the primary conductive path, frequency varying means to vary a frequency of a current in the primary conductive path, detection means to detect the frequency or an indication of the frequency in a pick-up inductively coupled with the primary conductive path, and control means to control the power supplied to a load associated with said pickup dependent on the detected frequency of the current in the primary conductive path.

Preferably the frequency of the current is determined by the power available to the system.

Preferably the power available to the system is determined by either or both the load on a power supply of the IPT system or the load on an electricity supply network supplying the power supply.

Preferably the load on the electricity supply network is determined by monitoring variations in the utility supply frequency of the electricity supply network.

Preferably the frequency varying means vary a frequency of the current in the primary conductive path by amplitude modulating an IPT-frequency alternating current by the utility supply frequency, the IPT-frequency being higher than the utility supply frequency, thereby varying the frequency of an envelope of the amplitude modulated current in the primary conductive path.

Preferably the frequency detection means detect the frequency of the envelope.

Preferably the frequency varying means vary the frequency of the current by varying the fundamental frequency of the current.

Preferably the frequency detection means detect the fundamental frequency of the current in the primary conductive path.

Preferably the control means control the power supplied to the load dependent on the relationship between the detected frequency and one or more predefined reference frequencies.

Preferably the control means control the power supplied to the load between a maximum power level and a minimum power level in response to variations of the detected frequency between an upper threshold frequency and a lower threshold frequency.

In a further aspect the invention broadly provides an IPT pick-up circuit, the circuit including detection means to detect a frequency of a current in a primary conductive path with which the pick-up may, in use, be inductively coupled, and control means to control the output power of the pick-up dependent on the detected frequency.

Preferably the detection means detect an envelope frequency of the current.

Alternatively the detection means detect the fundamental frequency of the current.

Preferably the control means control the output power dependent on the relationship between the detected frequency and one or more predefined reference frequencies.

Preferably the control means control the output power between a maximum power level and a minimum power level in response to variations of the detected frequency between an upper threshold frequency and a lower threshold frequency.

In a further aspect the invention broadly consists in IPT pick-up circuit, the circuit comprising a pick-up coil for inductive coupling with a primary conductive path of an IPT system, a frequency detector adapted to indirectly measure a frequency of an alternating current in the primary conductive path, and a power controller coupled with the pick-up coil and the frequency detector, wherein the power controller is adapted to vary the power output of the pick-up circuit in response to variations in the frequency measured by the frequency detector.

In a further aspect the invention broadly consists in an inductive power transfer (IPT) system comprising at least one pick-up according to any one of the preceding statements.

In a further aspect the invention broadly consists in an IPT system power supply for supplying current to a primary conductive path of an IPT system, the power supply including frequency varying means to vary a frequency of a current in the primary conductive path whereby the frequency of the current is determined by the power available.

Preferably the power available is determined by either or both the load on the power supply or the load on an electricity supply network supplying the power supply.

In a further aspect the invention broadly consists in an IPT system power supply having a three-phase input for receiving power from an electricity supply network at a utility supply frequency, a frequency detector for measuring the utility supply frequency, and an inverter to provide an alternating current to a primary conductive path of the IPT system at an operating frequency greater than the utility supply frequency, the inverter being further adapted to adjust the operating frequency in response to variations in the utility supply network.

Preferably the power supply is adapted to measure the utility supply frequency by measuring the frequency of the three-phase input and averaging over the three phases.

Preferably an operating frequency of the supply is adjusted between a minimum and a maximum frequency centred on an IPT frequency to which one or more pick-ups of the IPT system are tuned, the operating frequency being selected dependent on the utility supply frequency.

In another aspect the invention broadly consists in a method of controlling power delivered to one or more loads in an inductive power transfer (IPT) system including the steps of providing an indication of a utility supply frequency or power supply frequency to a pick-up circuit and using the indication to control the power output of the pick-up circuit In a further aspect the invention consist in an IPT system including a power supply according to any one of the preceding statements.

Further aspects of the invention, which should be considered in all its novel aspects, will become apparent from the following description.

DRAWING DESCRIPTION

A number of embodiments of the invention will now be described by way of example with reference to the drawings in which.

DETAILED DESCRIPTION OF ONE OR MORE EMBODIMENTS

Throughout the description like reference numerals will be used to refer to like features in different embodiments.

The present invention may broadly be said to consist in a method, power supply, pick-up, and system for controlling the power provided to one or more loads in an IPT system by essentially communicating a load condition or power availability from the power supply to the pickup so that the power provided to the load coupled with each pick-up can be controlled by the pick-up based on the load, or power availability, condition. The invention allows the load on the IPT system to be reduced based on the load demand being imposed on the IPT system power supply itself, or dependent on the load demand being imposed on a utility supply system to which the IPT power supply is connected.

Figure 1:
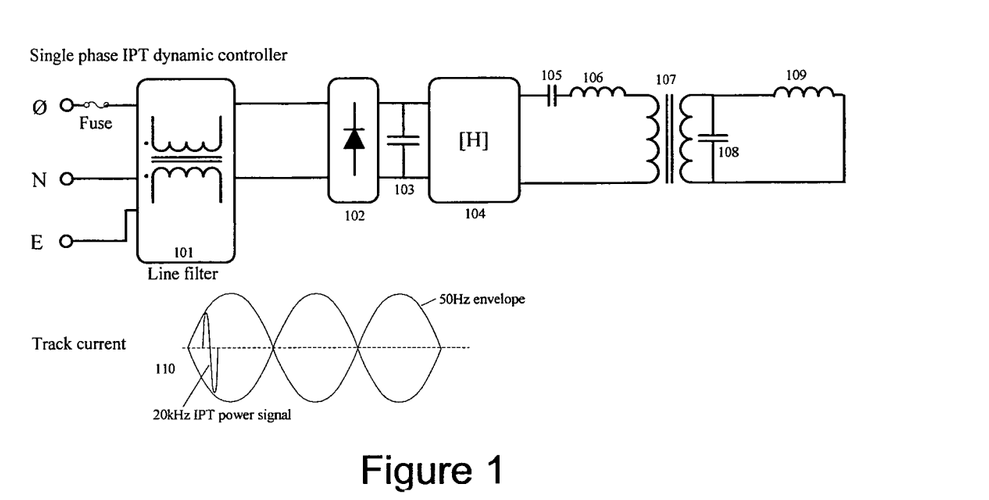
FIG. 1 is an example circuit diagram of the primary side of a first embodiment of an IPT system according to the present invention.

According to one embodiment of the invention, in which the power supply has an input for receiving single-phase power from a mains outlet connected to an electricity supply network or grid, the load condition is communicated to the or each pick-up by the frequency of the envelope of the amplitude modulated IPT frequency alternating current. The single phase mains input operates at a utility supply frequency of approximately 50 Hz (or 60 Hz, for example, depending on the electricity supply network). The track current supplied by the power supply to a primary conductive path or pad is therefore an alternating current of 20 kHz having an envelope frequency equal to the utility supply frequency as shown in FIG. 1. Thus the switching frequency and the envelope frequency are independent. The switching frequency transfers power and the frequency of the envelope provides information corresponding to the instantaneous utility supply frequency, thus enabling the pick-up to control power as necessary.

A power supply having a single-phase input suitable for providing the frequency of the envelope of the amplitude-modulated AC current output required in the present invention is described in the applicant's International Publication No. WO 2007/100265 entitled "Single Phase Power Supply for Inductively Coupled Power Transfer Systems", the contents of which are incorporated herein by reference.

If the grid is seriously overloaded the envelope will be at a frequency that is less than 50 Hz (in the example of a 50 Hz utility supply) and if it is having a momentary power surge then it will be at a higher frequency than 50 Hz. The envelope is easily detected using a frequency detector or envelope detector in the pick-up which is adapted to measure the envelope frequency of the voltage induced in the pick-up, and may therefore be said to be indirectly measuring a frequency of the track current. The pick-up (e.g. a battery charger) operates with a simple algorithm that the battery charging should be at zero power for frequencies of 49 Hz or below and increase linearly with frequency to 2 kW at frequencies 51 Hz or higher. This corresponds to a controller with 4% droop in frequency. Alternatively, the transfer characteristic of the pick-up may be non-linear, and the set points or predefined frequency thresholds can be varied to get the charging rate required. However an important feature is that as soon as the frequency drops to 49 Hz or below the charger drops all load. Thus the chargers cannot ever contribute to a fault situation where overload is driving the system to complete collapse. The system needs no communications system at all to produce a very nice control characteristic with 4% droop in frequency. Instead the communications information is carried in the envelope of the IPT system and is available system-wide on a cycle by cycle basis.

In an alternative embodiment where a three-phase power supply input is preferred or necessary to drive sections of road 100 m long, for example, the three-phase input is generally rectified and provided to an inverter to create an alternating track current at a suitable IPT frequency. The rectifier and inverter therefore essentially remove the utility supply frequency information of the 3 phase grid input from the track current. An alternative technique is therefore used where the power and the communications are both carried by the IPT frequency of approximately 20 kHz.

For any one of the input phases, the envelope information exists at a frequency of approximately 50 Hz. That frequency is measured—all phases can be measured and averaged to give a more accurate measure—very precisely and the IPT frequency is then carefully adjusted as it varies from the "normal" or expected frequency of 50 Hz. For example, if the utility supply frequency is 49 Hz the IPT frequency is selected as 19.9 kHz (i.e. normal IPT frequency of 20 kHz, minus 100 Hz); if the utility supply frequency is 51 HZ the IPT frequency is 20.1 KHz. Between these two extremes there is a linear mapping of the utility supply frequency to the IPT frequency. This change in the IPT frequency has a negligible affect on the IPT system as it is operating with Q values of the order of 3 for information signal bandwidths of the order of 6 kHz so that this modulation easily passes through the IPT system from the power supply to the track, to the AC IPT switch, to the ground pad and then to the vehicle pad. The controller with the vehicle pad decodes the information to decide how much power it should take—dependent on the IPT frequency (i.e. the "carrier" or fundamental frequency of the track current, as opposed to the envelope of the previous embodiment) and thus the utility supply frequency.

The same embodiment may also be used to solve the IPT power supply overload problem. If the IPT power supply (i.e. the power supply that energises the primary conductive path or track) is overloaded the IPT frequency can be reduced to remove that overload. For example with three buses at 50 kW each and 2 cars at 18 kW each (for a total of 186 kW) the frequency can be set such that all the controllers will take power proportional to 100/186 times their rating to give a total load of 100 kW—the rated load for the power supply. There are a large number of control options that may alternatively be used, but the power supply essentially commands the pad controllers in the vehicles to reduce power to such extent that the power supply is not over-rated and the system integrity is maintained. In doing this the frequency variation in the power system will be reduced and the quality of the grid power will be improved.

Practical implementations of the above two embodiments will be described herein below by way of example with reference to the drawings. It is to be appreciated that a number of modifications may be made to each embodiment and/or features of each embodiment interchanged, without departing from the scope of the invention.

Single-Phase IPT Power Controller

An example circuit diagram of a power supply according to the present invention having a single phase input for charging electric vehicle (EV) batteries is shown in FIG. 1. A single phase mains supply from an electricity supply network or grid passes through a line filter 101 and is rectified by bridge rectifier 102 to a small capacitor 103. This capacitor is deliberately chosen to be small so that the envelope of the output waveform (track current 110) will follow the input mains voltage (at the utility supply frequency of 50 Hz). The voltage across the capacitor 103 is converted to an AC voltage by the H-bridge inverter 104. Capacitor 105 blocks DC current from entering the transformer and tunes the leakage inductor 106 to the correct value. The transformer 107 converts the voltage level of the output voltage to the required value and the output of 107 is tuned with capacitor 108 and used to drive track 109 with track current 110 at a suitable frequency for inductive power transfer (e.g. 20 kHz).

Figure 2:
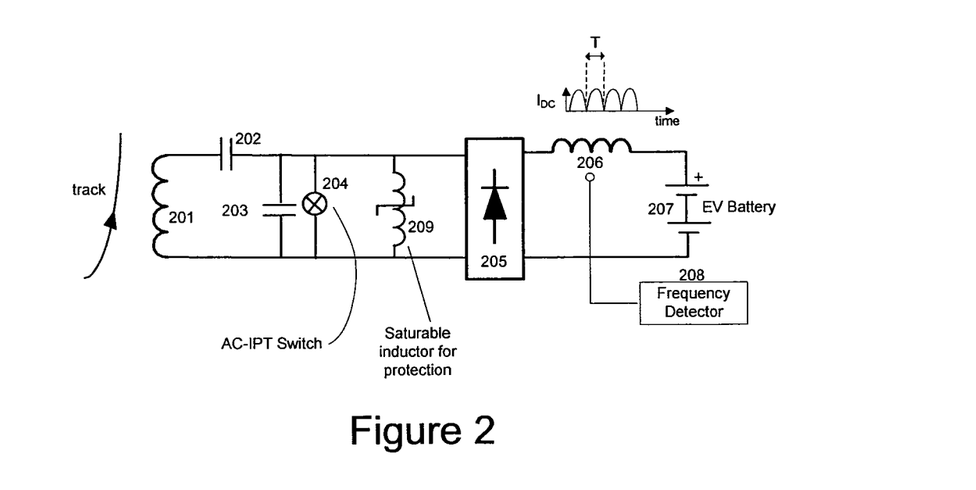
FIG. 2 is a circuit diagram of a pick-up circuit of a first embodiment of an IPT system according to the present invention.

In the secondary side of the system (e.g. an electric vehicle) the circuitry involved is shown by way of example in FIG. 2. Pick-up coil 201 in use is inductively coupled with the track or primary conductive path 109, and is partially series compensated with capacitor 202 and parallel compensated with capacitor 203.

The output voltage and current may be controlled by an IPT-AC controller 204, for example, or any other suitable controller such as a decoupling controller on the DC side of the pick-up circuit. The IPT-AC controller 204 comprises two opposing unidirectional switches, $S_1$ and $S_2$, each provided in series with a diode, $D_1$ and $D_2$ respectively, and in parallel with the capacitor 203. These switches are operated to disrupt the action of the circuit such that the phase angle may be forced to be a different value to that which would naturally occur. The technique for achieving this is to clamp the voltage across the parallel capacitor 203 so that it cannot cross zero until the switches so allow. Switch $S_1$ prevents a rise in the positive voltage across the tuning capacitor 203 and switch $S_2$ prevents the voltage across the tuning capacitor 203 from going negative. In operation these switches are switched on or off for 180 degrees but are delayed in phase relative to the normal voltage in the circuit. The overlap between the normally resonant voltage and the switching waveform is κ. This normally resonant voltage is not observable when the circuit is operating with a real load but the current in the track has the same phase and it is easy to observe. Switch $S_1$ is on for most of the negative half cycle of the waveform—where it has no effect—and for a small portion of the normal positive half cycle where it prevents any voltage rise until it turns off. Switch $S_2$ operates in the other half cycle. Both switches are on for 180 degrees but there is no overlap at all. The actual output voltage can have small flat periods in it but for high Q conditions these become very small. The waveform is still displaced and therefore the power transferred is reduced in a controllable fashion.

In one embodiment the phase of the track current is captured by a separate sensor on the track. Then using a phase locked loop precise 180 degree conduction square wave voltage references may be generated. These reference voltages may then be delayed as required with a microprocessor to give waveforms suitable for driving the switches to control the output voltage. The switches themselves are unidirectional and power MOSFETs provide a low cost choice. These are particularly easy to drive as with 180 degree conduction simple transformer isolation is suitable.

The output of the IPT-AC controller 204 is rectified by the rectifier 205 and the DC current modulated at the mains frequency that is output from 205 passes through DC inductor to EV battery 207. The DC inductor 206 is a high impedance at the IPT frequency (20 kHz) but is a low impedance at the mains modulating frequency (approximately 50 Hz).

Frequency detector 208 detects the frequency of the variation of the current in 206. Alternatively it can detect the frequency of the envelope of the resonant voltage across 203 which has the same form as the track current 109—the IPT power signal. The frequency detector may therefore be said to be indirectly measuring a frequency of the track current 109. Dynamic power control is achieved by controlling the power to the EV battery in proportion to the detected envelope frequency. Since the battery is of nominally constant voltage this means controlling the DC current in 206 to a value proportional to its frequency. IPT-AC controllers are particularly good at controlling an output current efficiently and are therefore chosen for this task but it should be noted that almost any other decoupling controller could be used in this application. Saturable inductor 209 is used as a protection measure in case of any unusual operating conditions such as abnormally high coupling of 201 with the track. If the voltage across 203 becomes abnormally high 209 will operate to de-tune the circuit, ensuring voltages and currents within the circuit are maintained within component ratings. In all other conditions 209 does not affect circuit operation.

Figure 3:
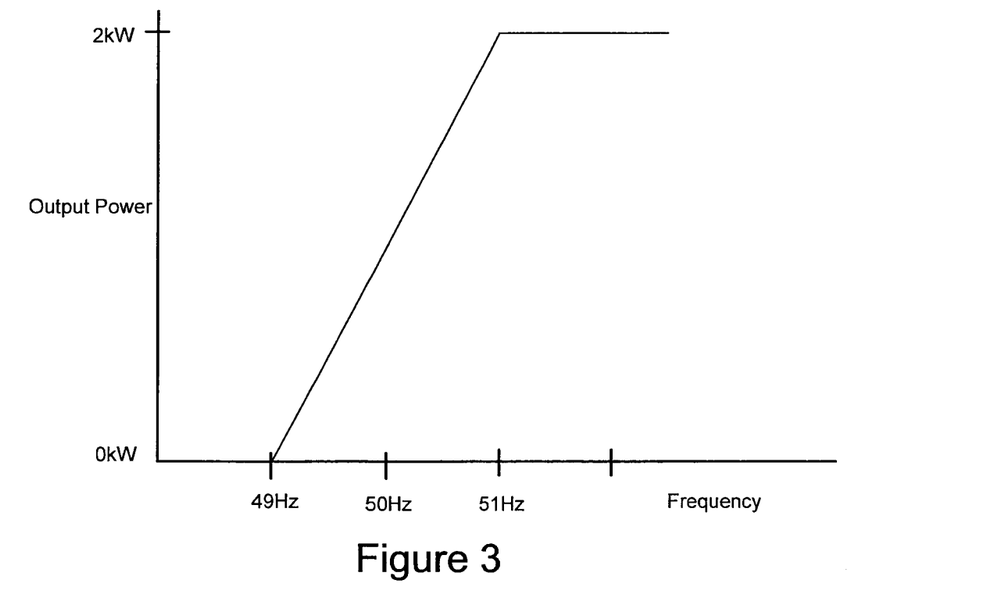
FIG. 3 shows an example pick-up power control scheme in the form of a linear transfer characteristic showing the relationship between the envelope frequency and output power of the pick-up of FIG. 2.

The control algorithm is shown in FIG. 3 for the case where the system frequency droop is 4%. This is a value commonly used in power systems but other values can be used as required—for example 1% or 2%. However, according to this example control scheme, if the detected frequency is less than 49 Hz the battery charging power is zero. If the detected frequency is greater than 51 Hz the output power is 2 kW. Between 49 Hz and 51 Hz the battery charging power varies linearly with frequency. The figure of 2 kW is chosen as most household power points around the world are rated at 220 V 10 A but other voltages currents and power ratings can of course be used.

When the power system has a lot of wind power added to it at times of wind surges the mains frequency will increase and the battery charging will increase. Conversely when the wind dies the charging will reduce. Thus this simple charger will improve the quality of supply with wind generation as it will help to stabilize the frequency.

This controller is suitable for charging vehicles in a home environment and can be extended to hundreds of thousands of controllers charging EV's all over the country with stability and no waveform distortion. When the power available is low the system helps avoid a power system collapse by dropping all load as soon as the frequency drops below 49 Hz.

Figure 4:
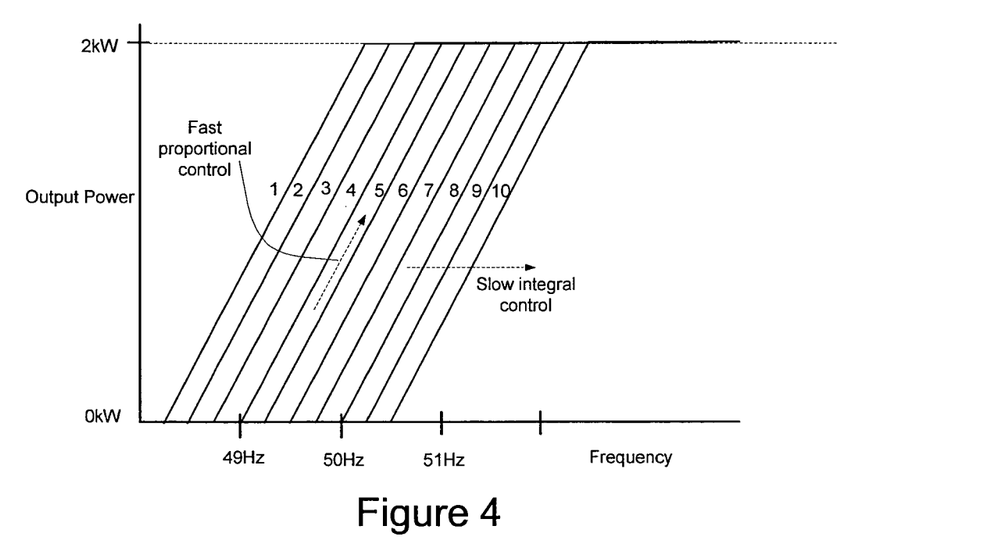
FIG. 4 shows an alternative pick-up power control scheme which may be implemented by a pick-up of the present invention.

Variations on this application may be made by changing the transfer characteristic in FIG. 3. As shown at a constant 50 Hz the battery power is only 1 kW so that only half of an expected charge will be achieved. A number of transfer characteristics may be included and selected as appropriate, as shown in FIG. 4. Here the system can be started on Characteristic 4 but as time proceeds if the frequency does not drop below 49 Hz characteristic 5 can be selected. In like manner if the frequency continues to hold up characteristic 6 is selected. This selection is a slow process (integral control) whereas the control action once the characteristic has been selected must be rapid. Here in the worst case the frequency must drop to 48 Hz before all load is dropped but this is still safely above the frequency at which generators start shutting down (typically 47 Hz) so that this controller will not contribute to a collapsing power system scenario.

In other embodiments, the transfer characteristic may be non-linear or discontinuous, comprising a plurality of discrete power output levels, for example.

Three-Phase IPT Power Controller

In a large system driven from a 3-phase power supply the technique used with the single phase system as above cannot easily be used, since after rectification the envelope information on the frequency of the power system is essentially lost. It is possible that a 300 Hz signal could be used but it would be a lot smaller and more prone to noise contamination.

Figure 5:
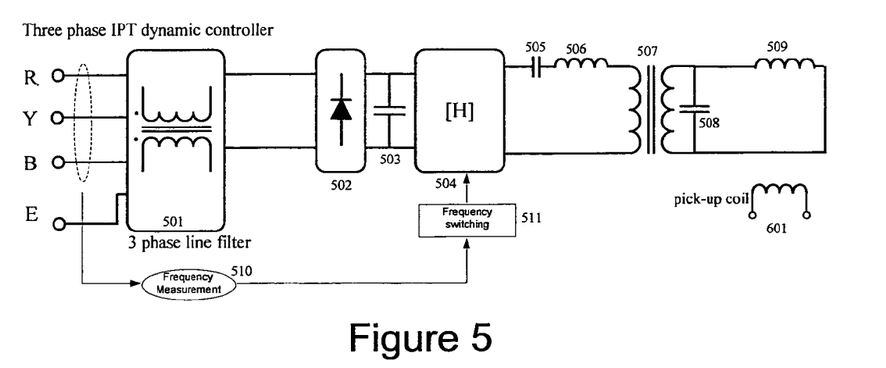
FIG. 5 is an example circuit diagram of the primary side of a second embodiment of an IPT system according to the present invention.
Figure 6:
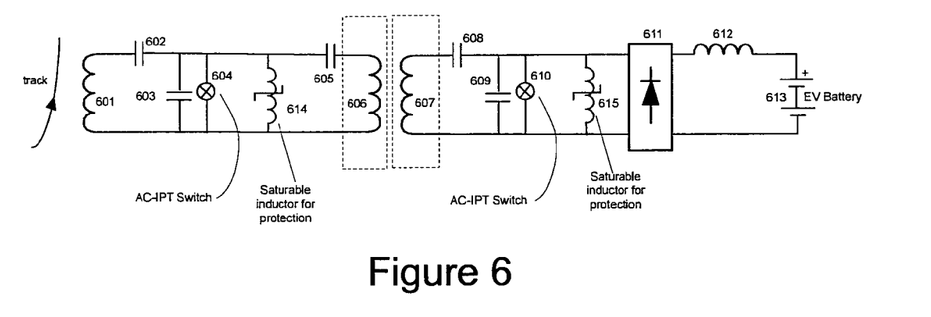
FIG. 6 is an example circuit diagram of the secondary side of the second embodiment.

A complete three-phase system is shown by way of example in the form of a power supply in FIG. 5 and a pick-up in FIG. 6. In FIG. 5 three-phase power denoted here by RYB for the individual phases is passed through a 3 phase line filter 501 and then rectified by rectifier 502 to a small DC capacitor 503 and then goes to an H-bridge inverter 504. The output from the H-bridge inverter 504 is an essentially constant voltage sine wave at approximately the IPT frequency—typically 20 kHz. This signal goes through DC blocking capacitor 505 to leakage inductor 506 and transformer 507. The leakage inductor may be completely contained within the transformer so that no physically separate component exists but it is still there and capacitor 505 compensates it to the correct value. The output from the transformer 507 is tuned by capacitor 508 and drives track inductor 509, which couples to one or more pick-ups represented in this diagram by a single pick-up coil 601.

As shown, the circuit of FIG. 5 is almost identical to that of FIG. 1. However, here there is no envelope information so a frequency measurement device 510 measures the instantaneous input frequency and modulates the switching frequency of the drivers 511 driving the H-bridge inverter 504, dependent on the mains frequency. Thus if the mains frequency is 50 Hz then the IPT frequency is chosen to be 20 kHz. If the mains frequency is 49 Hz the IPT frequency is chosen to be 19.9 kHz and if the mains frequency is 51 Hz then the IPT frequency is 20.1 kHz. In the single phase system the rectified mains caused sidebands on the IPT frequency at typically +/−100 Hz; here the sidebands correspond to a frequency modulation at 100 Hz and again the sidebands are essentially at +/−100 Hz so the information capacity of the power supply system is essentially the same. These modulation and demodulation methods are well known and are easily implemented.

Thus the track current in inductor 509 is frequency shifted when the input frequency is not 50 Hz whereas in the single phase system it was amplitude modulated at essentially the mains frequency of approximately 50 Hz. In both cases, however, a frequency of the track current (i.e. either the envelope frequency or the fundamental/carrier frequency) is indicative of the power available to the IPT system, which may be limited by high loads on the IPT power supply and/or the electricity supply network.

In this system the pick-up and signal processing is double IPT coupled for convenience of installation. First pick-up inductor 601 is series compensated with capacitor 602 and parallel tuned with capacitor 603. IPT-AC switch 604 controls the current to capacitor 605 and roadway mounted coil 606. Capacitor 605 is set to fully tune inductor 606 so that the AC switch 604 drives a fully tuned system and sees a resistive load. This means that the voltage across 604 is the minimum possible. Also different conduction angles in 604 cause different currents to flow in 606 (the coil in the roadway) so that the power transfer to pick-up coil 607 (the coil in a car, truck, or bus) may be set as required for the vehicle being charged. Thus a bus may be charged at a higher current than a car and a string of vehicles in a random string may be charged each with its own preferred current.

The voltage across 607 is series compensated with capacitor 608 and parallel compensated with capacitor 609. The output current from 607, 608 and 609 is controlled by another IPT-AC switch 610. This current is rectified by rectifier 611 and used to charge EV battery 613 through DC inductor 612. In the single phase circuit this current was modulated at mains frequency but here it is a constant current, which can be varied as required to change the charging rate of the battery by varying the clamp times in the IPT-AC switch. Here saturable inductors 614 and 615 are used to protect the control circuits only if the voltage across capacitors 603 or 609 respectively becomes too high.

In a practical application track inductance 509 is a long pair of wires excited by an IPT current of perhaps 125 A at 20 kHz. Pick-up coil inductance 601 may be made from a number of gapped toroids. Ground coil 606 is a large plate structure which couples to a similar plate inductance 607 across an air-gap of 200 mm or similar. The frequency of the voltage across capacitor 609 is the same as the frequency driving H bridge 504 so that all of the information put into the power supply modulation system can be recovered in the electric vehicle and used to make informed decisions on how to charge the electric vehicle depending on information from both the electricity network and the total load on the track 509. The aim is to stay within the maximum power that the power supply and track system can support while not overloading the 3-phase input if the power supply grid is itself overloaded. The pick-up circuit therefore includes a frequency detector (not shown) which is used to control the AC-IPT switch 610 by measuring the frequency of the voltage across the capacitor 609, for example. The frequency detector may therefore be said to be indirectly measuring a frequency of the track current, which is indicative of the power available to the IPT system.

The intermediate circuit comprising components 601-606 and 614 in the example above may be modified in some applications to provide a current in coil 606 which is at a different frequency to the frequency of the current in the primary conductive path 509. For example, referring to FIG. 7, an alternative circuit arrangement is shown. This circuit provides a frequency change as part of the double IPT conversion from the primary power supply to the pick-up. Although the frequency change is discussed below as being from 20 kHz to 140 kHz, those skilled in the art will appreciate that other frequencies may be used, and that the frequency may stay the same, or even decrease. A frequency increase to 140 kHz has the advantage in roadway IPT applications that the field at the coil modules in the roadway is more likely to satisfy ICNIRP requirements, and that high efficiencies can be obtained over the short transmission distance from the inverter to the transmission module or pad. In the first conversion a power supply 801 takes power from a 3-phase utility and produces an output current of 125 A that propagates in a wire buried under the road in the form of extended loop 802. This single wire loop is coupled by 1 turn to a pick-up/transformer 702 that is tuned by parallel tuning capacitor 703 to a resonant voltage less than 700V rms. The pick-up transformer 702 has a 6-turn secondary to give a secondary short circuit current of 21 A. This current passes through diode rectifier 704 to give a DC current of 20 A in DC inductor 705 which current is switched by 4-switch commutator/inverter 706 to produce an output AC current of approximately 19 A rms which feeds the CLC filter 707. This filter is an impedance converter with a characteristic impedance of 36 Ohms and produces an AC output voltage across C2 of 684 V at 140 kHz. This voltage drives the pad or module 808 or 809 with some compensation capacitors C3 and C4. In particular C4 increases the pad or module voltage to 1000 V while C3 tunes the pad to present unity power factor at its rated load. Pad or module 808/809 corresponds to coil 606 of the embodiment described immediately above. In the roadway example discussed with reference to the present embodiment the pad is on or buried under the roadway and couples inductively to a similar pad under a vehicle parked over the pad or module. This is the second IPT conversion for the circuit.

Figure 7:
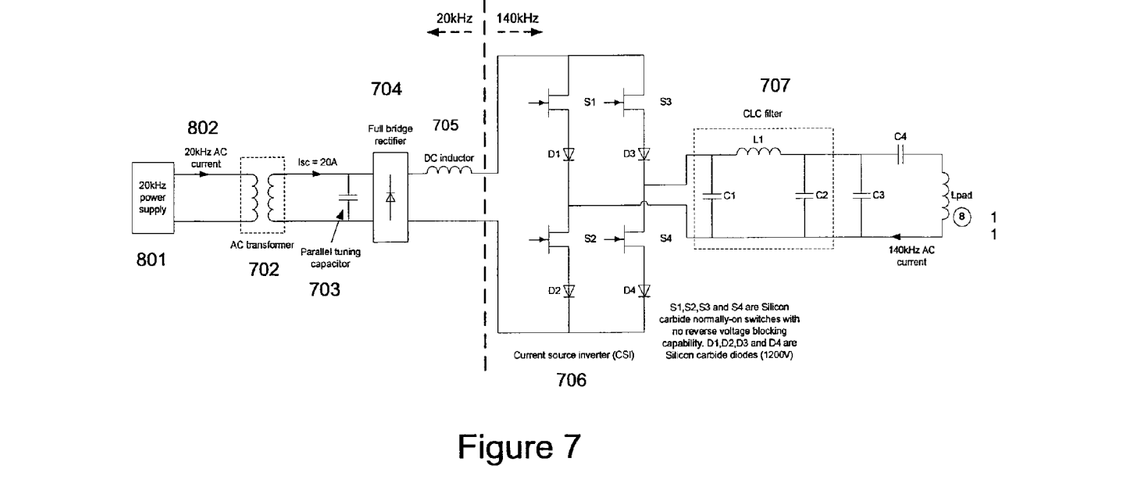
FIG. 7 is a circuit diagram showing an example of an alternative embodiment of an IPT power control system in which there is a frequency change between the primary power supply and the power supplied to the pick-up.

Under fault conditions an open-circuit across C2 presents a short circuit to the commutator 706 which presents a short circuit to rectifier 704 and shuts down the resonant circuit formed by pick-up transformer 702 and capacitor C3 so that no power is drawn from power supply 801. Conversely a short circuit across C2 presents an open circuit to the commutator which must be protected by turning all the switches on. The switches are normally-on devices so the circuit is started in a normally on condition and is easily switched to this under fault conditions.

The circuit has an input at 20 kHz which is rectified to DC by the diode bridge 704 and inverted back to AC at 140 kHz by commutator 706 to drive a power pad or module in an IPT system at 140 kHz. At this frequency the voltage drop per meter is very high so it is impractical to use along the roadway but here 20 kHz is used along the roadway and the 140 kHz is a very short connection from the impedance converter 706 to the pad 808/809 of only a few millimeters. This use of a higher frequency at the final stage can have advantages of increased efficiency. In this example the frequency of the current in the track is detected at the pick-up transformer 702, or at least prior to rectification, and the switches of inverter 706 are controlled to translate the frequency to the new (in this example increased) frequency. Thus the information present in the frequency of the current in the IPT system track is conveyed through the frequency change (for example through a multiplication process) to be available to the pick-up. In this example the pick-up controller detects the frequency information and acts to control the power supplied to the load accordingly. For example if the track frequency control range varies from 19.9 kHz corresponding to overload condition and 20.1 kHz corresponding to underload condition, then the corresponding frequency range at the pick-up in this example may be 139.3 kHz (overloaded) to 140.7 kHz (underloaded). Thus an indication of the primary conductive path frequency is provided.

Accordingly, from the above examples it can be seen that the present invention consists in a method of managing power delivery in an IPT system, an IPT system performing that method, a power supply communicating a load condition to one or more pickups by varying a frequency (either the envelope frequency or the fundamental frequency) of the track current, and/or an IPT pick-up adapted to detect the envelope/fundamental frequency of the track current and adjust its output accordingly. From the foregoing it will be seen that the invention removes the need for separate communications between the primary and secondary sides of the system in order to achieve secondary-side power control to avoid overloading of the power supply and/or electricity supply network or grid. However, those skilled in the art will appreciate that a separate communications channel can be used to convey the information on the instantaneous (or near instantaneous) frequency of the utility supply, or the frequency of the current in the primary conductive path, to one or more pick-up devices. The method/system has particular applications in both static and dynamic charging of vehicles' battery systems.

Moreover, as discussed above, IPT systems typically operate with a 40% load factor. The present invention allows the IPT power supply to pass information regarding its load status to the pick-up devices it supplies. Therefore, the invention allows IPT system load factors to be improved through use of lower rated power supplies.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

We claim:

1. A method of controlling power delivered to one or more loads in an inductive power transfer (IPT) system having a primary conductive path and one or more pick-up devices adapted to receive power inductively from the primary conductive path, the method comprising:
   varying a frequency of a current in the primary conductive path;
   detecting a frequency or an indication of the frequency in a pick-up inductively coupled with the primary conductive path; and
   controlling power supplied to a load associated with said pickup dependent on the detected frequency or the indication of the frequency of the current in the primary conductive path.

2. A method as claimed in claim 1 wherein the frequency of the current is determined by power available to the system.

3. A method as claimed in claim 2 wherein the power available to the system is determined by either or both a load on a power supply of the IPT system or a load on an electricity supply network supplying the power supply.

4. A method as claimed in claim 3 wherein the load on the electricity supply network is determined by monitoring variations in a utility supply frequency of the electricity supply network.

5. A method as claimed in claim 4 wherein varying a frequency of the current in the primary conductive path comprises amplitude modulating an IPT-frequency alternating current by the utility supply frequency, the IPT-frequency being higher than the utility supply frequency, thereby varying a frequency of an envelope of a amplitude modulated current in the primary conductive path.

6. A method as claimed in claim 5 wherein detecting the frequency of the current in the primary conductive path comprises detecting the frequency of the envelope.

7. A method as claimed in claim 1 wherein varying the frequency of the current comprises varying a fundamental frequency of the current.

8. A method as claimed in claim 7 wherein detecting the frequency of the current in the primary conductive path comprises detecting the fundamental frequency of the current in the primary conductive path.

9. A method as claimed in claim 1 wherein the power supplied to the load is controlled dependent on a relationship between the detected frequency or the indication of the frequency and one or more predefined reference frequencies.

10. A method as claimed in claim 1 wherein the power supplied to the load is controlled between a maximum power level and a minimum power level in response to variations of the detected frequency between an upper threshold frequency and a lower threshold frequency.

11. A method as claimed in claim 1 wherein the Step of detecting the frequency or an indication of the frequency includes detecting an increased or reduced frequency which is indicative of a frequency of a current in the primary conductive path.

12. An inductive power transfer (IPT) system having a primary conductive path and one or more pick-up devices adapted to receive power inductively from the primary conductive path, the system comprising:
   frequency varying means to vary a frequency of a current in the primary conductive path;
   detection means to detect the frequency or an indication of the frequency in a pick-up inductively coupled with the primary conductive path; and
   control means to control power supplied to a load associated with said pickup dependent on the detected frequency or the indication of the frequency of the current in the primary conductive path.

13. An IPT system as claimed in claim 12 wherein the frequency of the current is determined by power available to the system.

14. An IPT system as claimed in claim 13 wherein the power available to the system is determined by either or both a load on a power supply of the IPT system or a load on an electricity supply network supplying the power supply.

15. An IPT system as claimed in claim 14 wherein the load on the electricity supply network is determined by monitoring variations in a utility supply frequency of the electricity supply network.

16. An IPT system as claimed in claim 14 wherein the frequency varying means vary a frequency of the current in the primary conductive path by amplitude modulating an IPT-frequency alternating current by the utility supply frequency, the IPT-frequency being higher than the utility supply frequency, thereby varying a frequency of an envelope of an amplitude modulated current in the primary conductive path.

17. An IPT system as claimed in claim 16 wherein the frequency detection means detect the frequency of the envelope.

18. An IPT system as claimed in claim 12 wherein the frequency varying means vary the frequency of the current by varying a fundamental frequency of the current.

19. An IPT system as claimed in claim 18 wherein the frequency detection means detect the fundamental frequency of the current in the primary conductive path.

20. An IPT system as claimed in claim 12 wherein the control means control the power supplied to the load dependent on a relationship between the detected frequency or the indication of the frequency and one or more predefined reference frequencies.

21. An IPT system as claimed in claim 12 wherein the control means control the power supplied to the load between a maximum power level and a minimum power level in response to variations of the detected frequency between an upper threshold frequency and a lower threshold frequency.

22. An IPT system as claimed in claim 12 wherein the detection means detect an increased or reduced frequency which is indicative of a frequency of a current in the primary conductive path.

23. An IPT pick-up circuit, comprising:
    detection means to detect a frequency of a current in a primary conductive path with which a pick-up may, in use, be inductively coupled; and
    control means to control output power of the pick-up dependent on the detected frequency.

24. An IPT pick-up circuit as claimed in claim 23 wherein the detection means detect an envelope frequency of the current.

25. An IPT pick-up circuit as claimed in claim 23 wherein the detection means detect a fundamental frequency of the current.

26. An IPT pick-up circuit as claimed in claim 23 wherein the control means control the output power dependent on a relationship between the detected frequency and one or more predefined reference frequencies.

27. An IPT pick-up circuit as claimed in claim 23 wherein the control means control the output power between a maximum power level and a minimum power level in response to variations of the detected frequency between an upper threshold frequency and a lower threshold frequency.

28. An IPT pick-up circuit, comprising:
    a pick-up coil for inductive coupling with a primary conductive path of an IPT system;
    a frequency detector adapted to indirectly measure a frequency of an alternating current in the primary conductive path; and
    a power controller coupled with the pick-up coil and the frequency detector, wherein the power controller is adapted to vary a power output of the pick-up circuit in response to variations in the frequency measured by the frequency detector.

29. An IPT system power supply for supplying current to a primary conductive path of an IPT system, the power supply comprising frequency varying means to vary a frequency of a current in the primary conductive path whereby the frequency of the current is determined by the power available.

30. An IPT system power supply as claimed in claim 29 wherein the power available is determined by either or both a load on the power supply or a load on an electricity supply network supplying the power supply.

31. An IPT system power supply comprising:
    a three-phase input for receiving power from an utility supply network at a utility supply frequency;
    a frequency detector for measuring the utility supply frequency; and
    an inverter to provide an alternating current to a primary conductive path of the IPT system at an operating frequency greater than the utility supply frequency, the inverter being further adapted to adjust the operating frequency in response to variations in the utility supply network.

32. An IPT system power supply as claimed in claim 31 wherein the power supply is adapted to measure the utility supply frequency by measuring a frequency of the three-phase input and averaging over the three phases.

33. An IPT system power supply as claimed in claim 31 wherein an operating frequency of the supply is adjusted between a minimum and a maximum frequency centred on an IPT frequency to which one or more pick-ups of the IPT system are tuned, the operating frequency being selected dependent on the utility supply frequency.

34. A method of controlling power delivered to one or more loads in an inductive power transfer (IPT) system comprising:
    providing an indication of a utility supply frequency or power supply frequency to a pick-up circuit; and
    using the indication to control power output of the pick-up circuit.

35. A method as claimed in claim 34 wherein the indication is provided via inductive coupling between a power supply of the IPT system or by a communications channel.

* * * * *